United States Patent [19]

Rieder et al.

[11] Patent Number: 5,279,043

[45] Date of Patent: Jan. 18, 1994

[54] LENGTH MEASURING SYSTEM

[75] Inventors: Heinz Rieder, Oberndorf; Max Schwaiger, Ostermiething, both of Austria

[73] Assignee: RSF-Elektronik Gesellschaft m.b.H., Tarsdorf, Austria

[21] Appl. No.: 855,218

[22] Filed: Mar. 20, 1992

[30] Foreign Application Priority Data

Mar. 25, 1991 [AT] Austria ............................... 650/91
Apr. 30, 1991 [AT] Austria ............................... 897/91

[51] Int. Cl.$^5$ ............................................. G01B 21/02
[52] U.S. Cl. ........................................ 33/702; 33/704; 33/DIG. 19
[58] Field of Search ................. 33/700, 702, 704, 706, 33/DIG.

[56] References Cited

U.S. PATENT DOCUMENTS

| | | |
|---|---|---|
| 3,816,002 | 6/1974 | Wieg . |
| 4,320,578 | 3/1982 | Ernst ................... 33/702 |
| 4,477,726 | 10/1984 | Reichi ................ 33/706 X |
| 4,479,304 | 10/1984 | Nelle ..................... 33/700 |
| 4,530,157 | 7/1985 | Nelle ..................... 33/700 |
| 4,569,137 | 2/1986 | Ichikawa ............... 33/706 |
| 4,776,098 | 10/1988 | Nelle ..................... 33/702 |
| 5,016,359 | 5/1991 | Nagaoka et al. ...... 33/706 X |

FOREIGN PATENT DOCUMENTS

| | | |
|---|---|---|
| 1773403 | 6/1971 | Fed. Rep. of Germany . |
| 2643304 | 9/1978 | Fed. Rep. of Germany . |
| 2853771 | 6/1980 | Fed. Rep. of Germany . |

Primary Examiner—Thomas B. Will
Assistant Examiner—Alvin Wirthlin
Attorney, Agent, or Firm—Kurt Kelman

[57] ABSTRACT

A length measuring system comprises an elongate scale member adapted to be scanned for generating measured-length signals, a tubular scale member carrier defining an internal cavity housing the scale member and including a mounting wall, a connection of the scale member to the scale member carrier, the connection permitting a longitudinal movement of the scale member relative to the scale member carrier, and end blocks rigidly connected to the scale member carrier at both ends thereof, the end blocks defining recesses and having opposite sides. Devices are provided in the recesses of the end blocks for fastening the scale member carrier to an object and for compensating for length differences resulting from a differential thermal expansion of the scale member carrier and the object, the devices including an intermediate part having two ends and defining a through hole between the ends for receiving a fastening element for fastening the end blocks to the object, and webs having one end connected to the ends of the intermediate part and extending transversely to the longitudinal direction, the webs defining at least along a major portion of their length a clearance with the fastening element and adjacent surfaces of the recess, and an opposite end of the webs connected to the end blocks, the webs having a relatively small flexural stiffness in the longitudinal direction and a relatively high flexural stiffness in a direction extending transversely to the longitudinal direction.

9 Claims, 4 Drawing Sheets

LENGTH MEASURING SYSTEM

BACKGROUND OF THE INVENTION

1. Field of the Invention

This invention relates to a length measuring system comprising a scale member and a scanning unit, which is movable along said scale member, wherein the scale member is accommodated in a scale carrier, which constitutes a tubular protective housing for the scale member and the scanning unit, and is connected to said scale carrier by means which permit a relative longitudinal movement. The scale carrier is provided with fasteners, such as screws, for connection to an object, such as a bed of a machine, at least at locations adjacent to end blocks of the scale carrier and, optionally, at a plurality of locations spaced along the scale carrier, and compensating means adjacent to these locations serve to effect a compensation of length differences resulting from a differential thermal expansion of the object and the scale carrier.

Such design features are embodied in length measuring systems to ensure that the scale member will not be acted upon by undesired forces and/or deformations caused by thermal expansion and that a displacement of a reference point of the scale, which is provided at one end or at the center of the scale and in incremental measuring systems may be defined, e.g., by a reference mark with reference to an associated reference point on the object, e.g., a zero measurement location of a machine tool, should be avoided as far as possible.

2. Prior Art

From DE-A 17 37 403 it is known that the scale carrier can be secured to the machine bed by screws, which are inserted through larger-diameter bores in the scale carrier, and the clearance between the diameters is occupied by bushings, which are made of rubber-elastic material and extend in the bores and surround the screws. But in that design the scale carrier and the measuring system can be displaced transversely to its longitudinal direction and for this reason different compensating means are preferred. According to U.S. Pat. No. 3,816,002 at least one end of the scale carrier is formed with a slot for receiving a screw fastener, which in the slot is enlarged to form a locating pin and by means of a coil spring or a series of disk springs the head of said screw applies pressure to the longitudinal edges of the slot so that the scale carrier can expand and contract along the slot under the action of heat. From De-A 26 43 304 it is known that the scale member, which in most cases is made of glass, can be secured to the scale carrier by means of a highly elastic adhesive in such a manner that a flat surface of the scale member lies on the thin adhesive coating and can be fixed adjacent to a reference point by means of an adhesive having a low elasticity. It is known from DE-A 28 53 771 that a tubular scale carrier may be provided with end blocks, which are formed with through holes for screw fasteners and which are not rigidly connected directly to the respective ends of the scale carrier and that each of said end blocks at its end facing the scale carrier may be formed with meandering slots extending from the top and bottom, respectively, so that weak portions are provided, which permit a longitudinal displacement of the scale carrier relative to the mounting blocks, which are rigidly mounted. That design has the disadvantage that the weak portions require additional space in the longitudinal direction of the scale member, a satisfactory guidance of the scale carrier only in its longitudinal direction is not ensured, and the end blocks cannot be provided with plugs, which extend into and are sealed in the interior of the tubular scale carrier so that said interior is hermetically sealed at both ends. Means for a length compensation provided at end-mounting elements may alternatively, consist of additional spring elements, spring hinges, resiliently interconnected angle members, and hinges, which pivotally connect the carrier to each mounting block on an axis which is at right angles to the longitudinal direction of the scale carrier. In all said cases there is a risk that the overall arrangement may be unstable or that the longitudinal guidance of the scale member relative to the object is not sufficiently precise or, in many cases, that the length of the overall arrangement is highly undesirably increased by the additional compensating means provided adjacent to the ends, or in that a temperature rise and temperature drop will result in undesired motions. Particularly if the scale member is long the known continuous fixation by means of a thin and yieldable adhesive layer will not ensure a sufficient compensation of length differences between the scale member and the scale carrier so that the forces which are due to thermal expansion will result in an undesired deformation and/or stressing of the scale member if its length exceeds a certain limit and in any case if its length exceeds an order of 1 meter.

SUMMARY OF THE INVENTION

It is an object of the invention to avoid the disadvantages outlined hereinbefore and to provide a length measuring system which has a simple design and will reliably ensure a compensation of a differential thermal expansion of the scale member and scale carrier even if the scale and the measuring system have large lengths; besides, expensive means should not be required and it should not be necessary to undesirably increase the length of the measuring system and/or to provide it with additional mounted parts for the incorporation of such compensating means.

The object set forth is basically accomplished in that each compensating means comprises an intermediate part formed with a through hole for the associated screw fastener and with retaining legs, which are joined to said intermediate part at both ends thereof and in a direction which is substantially at right angles to the longitudinal direction of the carrier extend into recesses formed in the scale carrier and/or in the end blocks of the scale carrier and at least in a major part of their length are clear of the screw fastener and of the surface of the recess and have ends which act on the scale carrier and/or the end block and said projections have a relatively low flexural stiffness in the longitudinal direction of the scale carrier and a relatively high flexural stiffness transversely to at right angles to said longitudinal direction.

The slots may simply be formed so that the legs merge into the intermediate part on the forward side of the scale carrier or end block and merge into the rigid material of the scale carrier or block on the rear side of the scale carrier or of the end block, or vice versa. Alternatively, the scale carrier or the end blocks may be formed with offset slots, which define legs, which extend twice or more times forwardly and rearwardly between the forward and the rear sides to constitute spring elements, which owing to their height effect an adequate lateral stabilization to permit only an adjustment in length but do not permit a lateral excursion of the scale carrier relative to the mounting means.

The slots and recesses defining the compensating means may provide weak portions in a scale carrier which is constituted by a relatively thick wall of the tubular protective housing, and in relatively long measuring systems a plurality of such compensating means may be spaced apart along the scale carrier, which in that case can be connected to the object at a plurality of locations and yet the desired compensation of length differences can be effected in case of a change of the ambient temperature. The full stability of the scale carrier will be preserved between the mounting locations. The compensation of length differences is effected in part by a deformation of the legs at adjacent mounting locations so that the total length changes of the scale carrier in case of a given temperature change will be smaller than in known measuring systems. Besides, the compensating means provided in accordance with the invention do not require the length measuring system to be provided with additional mountings for ensuring the compensation of length differences.

Another embodiment affords the advantage that the openings required in the end blocks may have a simple basic shape so that they can easily be formed and that inserts varying in stiffness may be used so that their characteristics can be selected in view of the requirements in each case, e.g., on the weight and length of the measuring systems and on ambient conditions. The compensating means do not add to the length of the length measuring system. The compensating means may be designed to prevent a lateral deviation of the excursion of the scale carrier at right angles to its longitudinal direction.

The slot may permit an adjustment of the length measuring system at right angles to its longitudinal direction. Alternatively, the slot may contain an insert, which is adapted to be fixed by the screw fastener so that the slot and the insert will increase the stability of the mounting. The resistance presented by the insert to an adjustment in length will depend on the thickness of the flanges and legs, on the overall shape of the compensating means, on the material employed and on the free length of the legs. If the length of the receiving opening conforms to the free length of the legs and the length ends of the legs are supported in said receiving opening, the lateral stability of the mounting will be increased so that the length measuring system cannot yield laterally even in case of a thermal expansion. The legs may be so arranged that they cannot perform any movement which might result in a loosening of the screw fasteners and the maintenance of a snug mounting of the measuring system on the object will be ensured.

In one embodiment, the sleeve will result in a behavior that is similar to that of a resilient insert. Adjacent to its narrow side walls which connect the ends of the hat-shaped insert to form a sleeve the wall of said sleeve may be relatively thin or corrugated so that the flexural stiffness in the longitudinal direction of the measuring system will be decreased.

In another embodiment of the invention, the known fixation of the scale member by means of an adhesive layer is abandoned and it is ensured that the reinforcement will take up at least a major part of the forces which in case of a length change are exerted via the rubber-elastic material disposed between the reinforcement and the surface of the groove. Because the length of the reinforcement will not be changed or will be changed only to a very small extent, only no longitudinal forces or only very small longitudinal forces will be transmitted by the rubber-elastic material disposed between the reinforcement and the scale member so that it will readily be possible to substantially prevent thermally induced stresses even in long scale members. Besides, the additional reinforcement bridges the weak portions formed in the wall of the tubular protective housing owing to the slots and recesses and thus contributes to the overall stability.

According to a preferred feature, a laminate may be prefabricated and may be bonded to the surface of the groove and to the scale member immediately before the scale member is mounted in the scale carrier so that the laminate may be used to adhesively bond the scale member to the scale carrier. In a different embodiment, which is technically more difficult, the metal strip or another reinforcing element, such as a gridlike strip, may be inserted into the groove beside the scale member and the space between the surface of the groove and the scale member may be filled with fully vulcanizable material, in which the reinforcing element is embedded.

BRIEF DESCRIPTION OF THE DRAWING

Further details and advantages of the invention will become apparent from the following description of the drawings.

DETAILED DESCRIPTION OF PREFERRED EMBODIMENTS

Figure 6:
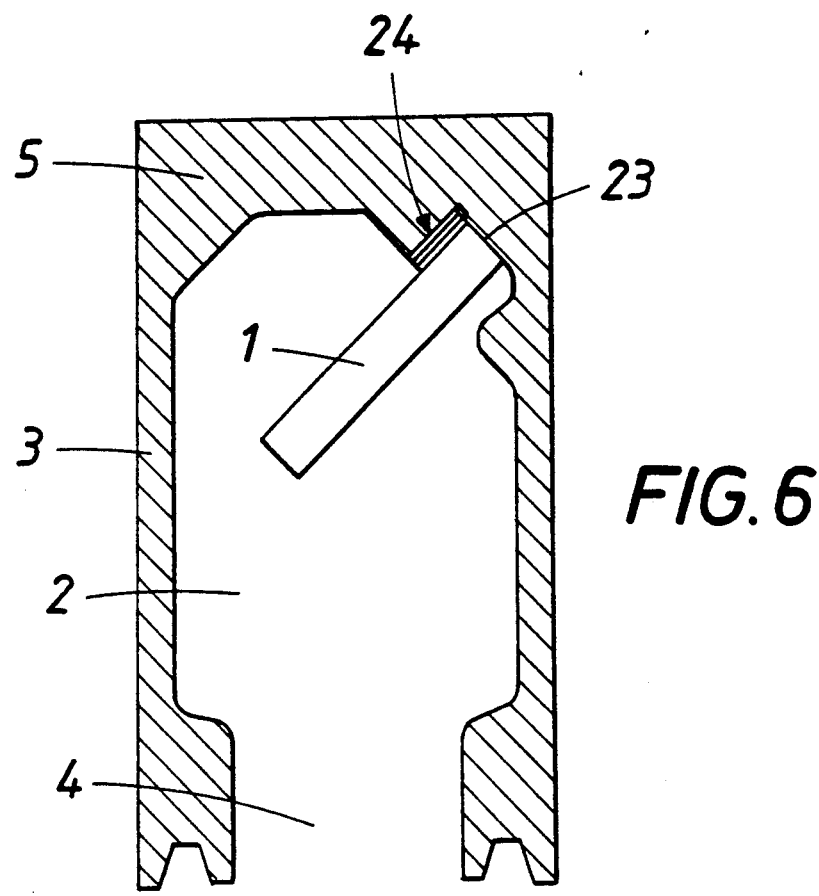
FIG. 6 is an enlarged transverse sectional view showing a tubular scale carrier containing a scale member, which is indicated only by its contours.
Figure 7:
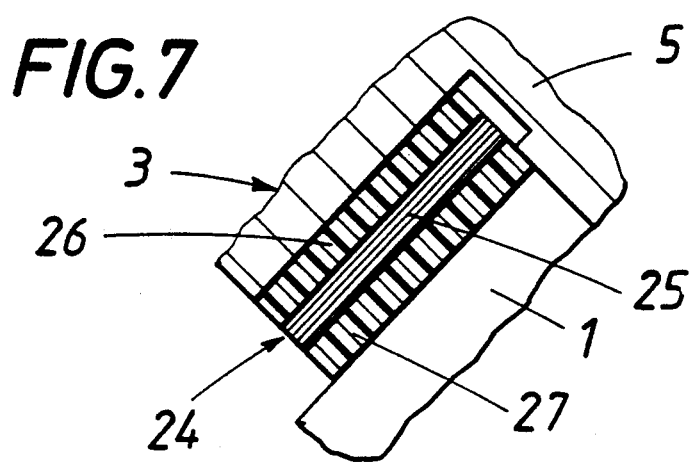
FIG. 7 is a sectional view showing as a detail of FIG. 6 the region in which the scale member is mounted.

The length measuring system comprises a scale member 1, which is made of glass and is indicated only in FIGS. 6 and 7. It is provided with an incremental or absolute scale, which can be scanned by a scanning unit, e.g., by optoelectronic methods, for generating measured-length signals.

The scanning unit, a coupling member for the scanning unit, and other known elements of the length measuring system are not shown. In most cases, sealing means, also not shown, are provided for sealing a swordlike coupling member where it enters an internal cavity 2 of a tubular scale carrier 3.

Figure 1:
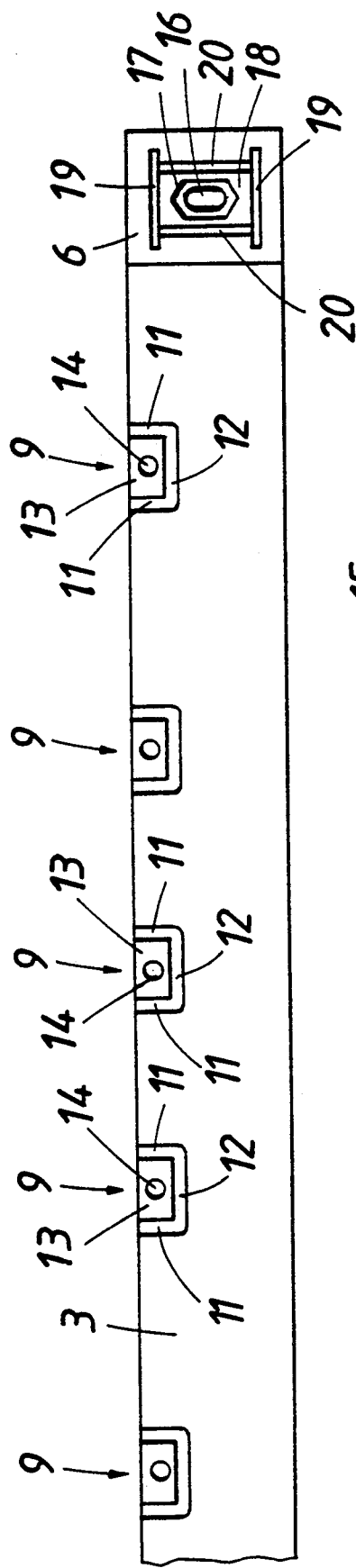
FIG. 1 is a simplified fragmentary rear elevation showing a portion of a tubular scale carrier provided with an end block.
Figure 3:
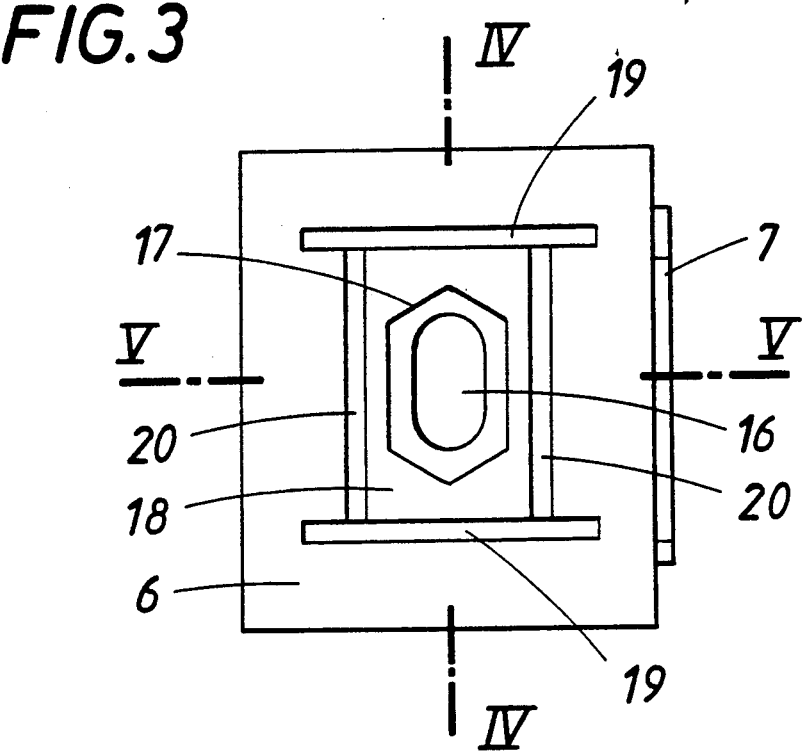
FIG. 3 is an enlarged side elevation showing the end block of FIG. 1 in detail.

As shown in FIG. 6, scale carrier 3 has basically the shape of a rectangular-section tube, which at its bottom is formed with a receiving slot 4. Opposite to the slot 4 the tubular scale carrier 3 has a relatively thick top or mounting wall 5 for mounting scale member 1. While only one end block is shown in FIG. 1, scale carrier 3 is provided at each end with an end block 6 which, as shown in FIG. 3, comprises a plug 7 that fits in the cavity 2 of the tube to seal that cavity from the outside. Each end block may be connected to the scale carrier 3 by longitudinal screw fasteners, which extend into the mounting wall 5 through holes 8, and/or may be connected to the scale carrier by adhesive joints and by silicone gaskets which surround the plug. The scale carrier 3 is secured to an object, such as the bed of a machine tool, by means of screw fasteners. In the embodiment shown in FIG. 1, the scale carrier 3 can be secured to the machine bed by means of screw fasteners and/or each end block can be secured to the machine bed by screw fasteners, which extend through the end blocks 6 and will be described hereinafter in more detail. One of the mounting means 9 of the scale carrier body 3 may serve for a fixed mounting and may comprise a transverse through bore in the mounting wall 5.

The remaining mounting means 9 are provided with compensating means, which with the exception of the fixed mounting means will permit in case of a thermally induced differential longitudinal expansion of the machine bed and the scale carrier 3 a slight longitudinal displacement of the scale carrier 3. For this purpose the mounting wall 5 is integrally formed with compensating means at each mounting means 9. In the embodiment shown in FIGS. 1 and 2, each of said compensating means is defined by a recess 10, which has been milled into the mounting wall 5 from one side (the front or rear side), and vertical slots 11 extend from the other side of the mounting wall 5 and open at the bottom into a horizontal slot 12, which extends throughout the width of the mounting wall 5. As a result, the compensating means comprise an intermediate part 13, which is formed with a through hole 14 for a screw fastener, and webs 15, which define the recess 10 and the slots 11 and merge into the rigid material of the top wall 5 connecting intermediate part 13 to the top wall. As a result, the mounting wall 5 has a relatively weak portion adjacent to each mounting means 9. The webs 15 permit a displacement of the scale carrier 3 only in its longitudinal direction and prevent a displacement of the scale carrier at right angles to that longitudinal direction.

Figure 4:
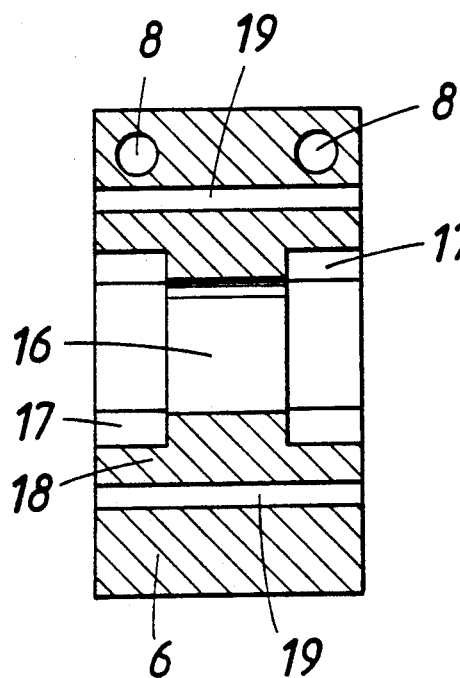
FIGS. 4 and 5 are sectional views taken on lines IV—IV and V—V in FIG. 3.
Figure 5:
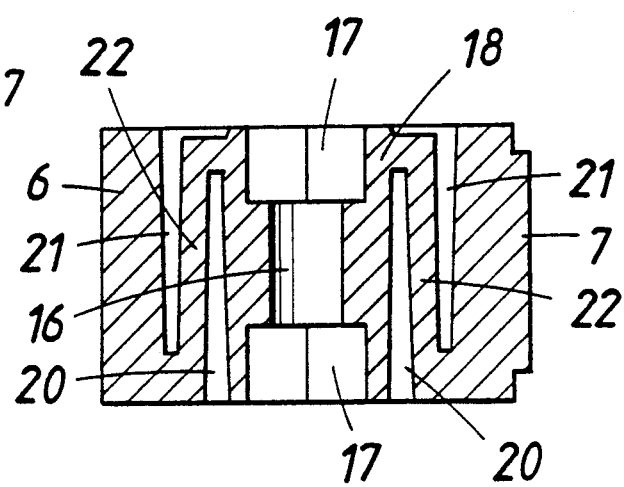

As shown in FIGS. 3 to 5, each end block is formed with a central slot 16 for receiving a screw fastener, which has a shank that has an elongate shape in cross-section and fits the slot 6 to stabilize the end block in position. At each end of the slot 6 the latter is enlarged to form a polygonal recess 17, which at one end of the slot receives a mating head of a screw fastener and at the other end of the slot receives a mating nutlike member, which is slidably fitted on the screw fastener, which is thus held against rotation. The openings 16 and 17 are formed in an intermediate part 18, which is defined at its top and bottom by open-ended clearance slots 19. Vertical slots 20 extend from the forward side of the end block 6 and terminate close to the rear surface of the end block 6. Vertical slots 21, which are spaced from the slots 20, extend into the end block 6 from its rear surface and terminate close to its forward surface. Said slots 20 and 21 define legs 22, which extend substantially at right angles to the longitudinal direction of the scale carrier 3 and are defined at the top and bottom by the clearance slots 19 and which at the inner edge of the slots 20 merge into the intermediate part and at the inner edge of the slots 21 merge into the material of the end block 6. Owing to that design, the slots 19 to 21 and the legs 22 defining said slots permit a longitudinal displacement of the end block 6 relative to the screw fastener, which extends through the slot 16, and relative to the intermediate part 18.

As is apparent from FIGS. 6 and 7 top wall 5 of the scale carrier 3 is formed with a groove 23 and one longitudinal edge portion of the scale member 1 extends into said groove 23 and is secured to top wall 5 in said groove. As is shown, the scale member 1 may be secured only on one side face of the groove. Alternatively, the scale member 1 may be secured to both side faces of the groove. The fixation is effected by a laminated strip 24, which is shown in more detail in FIG. 7. The laminated strip 24 comprises an inner metal strip 25 that is made of a material, such as steel, which has approximately the same coefficient of expansion as the glass scale member 1. That metal strip 25 is covered on both sides with rubber-elastic strips 26 and 27, which may consist of silicone rubber and are bonded by adhesive layers to the metal strip 25 and to the side face of the groove or to the adjacent edge of the scale member 1. The metal strip 25 constitutes a reinforcement, which will absorb at least a major part of the stresses which arise in case of a differential thermal expansion of the scale carrier 3 and the scale member 1 and are transmitted through the rubber-elastic strip 26. Because the thermal expansions of the scale member and of the metal strip 25 are substantially equal, only negligibly small stresses will arise in the rubber-elastic strip 27 and the forces which are due to the differential thermal expansion will not act on the scale member 1.

Figure 2:
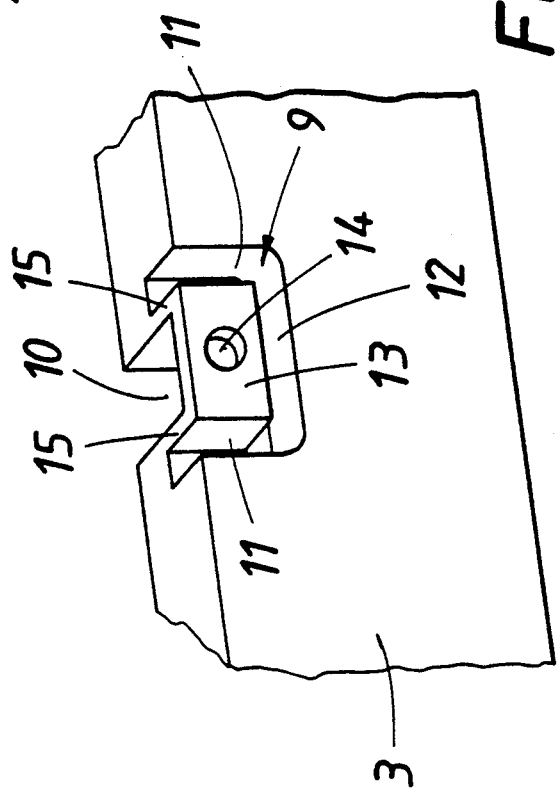
FIG. 2 is an enlarged fragmentary perspective view showing a portion of the scale carrier adjacent to compensating means.
Figure 8:
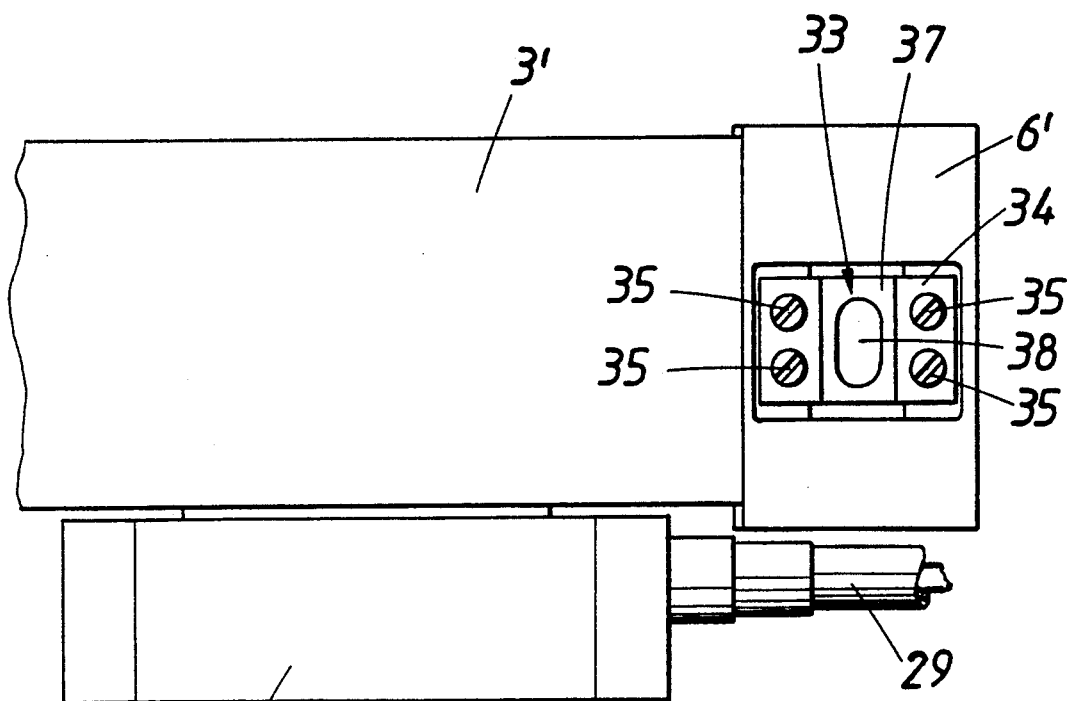
FIG. 8 is a simplified fragmentary front elevation showing a portion of a tubular scale carrier provided with an end block of a different embodiment.
Figure 9:
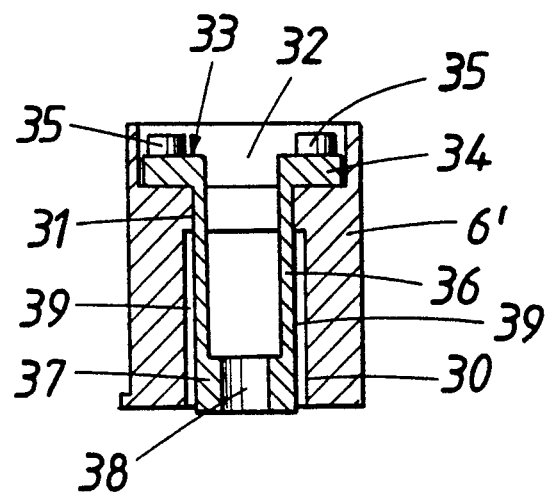
FIG. 9 is a transverse sectional view showing the end block of FIG. 8 without the screw fastener.

In the embodiment shown in FIGS. 8 and 9, those parts which are identical to parts shown in FIGS. 1 and 2 are designated by the same reference characters with an added prime ('). A coupling member extends through a slot which corresponds to the slot 4. That coupling member is connected at one end to a scanning unit, which is movable along the scale member. The coupling member is connected at its outer end to a mounting block 28. The protective housing 3' can be connected to a stationary part of a machine, and the mounting block 28 may be connected to a movable part of another machine part, which is operable to perform relative to the part 3' a movement which is to be measured. An electric cable 29 is connected to the scanning unit and extends from the block 28 to an evaluating unit. The means described thus far with reference to FIGS. 8 and 9 are known per se. The length measuring system can be secured, e.g., to the bed of a machine, by means of screw fasteners, which are mounted in the end blocks 6'. In long length measuring systems, the scale carrier 3' may also be secured to a stationary structure by intermediate mounting means, which may be of the type shown in FIGS. 1 and 2 and can yield in the longitudinal direction of the scale carrier 3'.

The end blocks 6' are provided with special mounting means for a compensation of a differential thermal expansion of the object, the scale member, and the scale carrier 3'. Each end block 6' is formed with a vertical through opening 30, which is basically rectangular in cross-section and has a bottom portion which has a certain size and merges into a portion 31 which is smaller in cross-section and finally opens into an enlarged recess 32.

An insert 33 is fitted in the opening 30 and is basically hat-shaped and at its top end comprises flanges 34, which extend in the recess 32 and are fixed therein by screws 35. Said flanges 34 are connected by legs 36 to an intermediate part 37, which is again thicker and is formed with a slot 38 for receiving the screw fastener. The insert 33 engages the surfaces of the opening 30 only by means of its legs 36 close to the flanges 34 but may contact the surfaces of the slot also at the forward and rear edges of the legs 36 or may be provided with an extension which, when viewed as in FIG. 8, extends upwardly and downwardly and when viewed as in FIG. 9 extends forwardly and rearwardly and which is guided on the longitudinal side faces of the opening 30. In the remaining parts of the opening the insert 33 defines clearances 39 in front and at the rear so that a differential thermal expansion can be taken up by a resilient deflection of the legs 36.

In a modified embodiment, the insert 33 may be replaced by a sleeve, which has an elongate shape in cross-section and has approximately the same shape in longitudinal section.

We claim:

1. A length measuring system comprising
   (a) an elongate scale member adapted to be scanned for generating measured-length signals,
   (b) a tubular scale member carrier defining an internal cavity housing the scale member and including a mounting wall having opposite sides,
      (1) the scale member and the scale member carrier extending in a longitudinal direction,
   (c) means connecting the scale member to the scale member carrier, the connecting means permitting a longitudinal movement of the scale member relative to the scale member carrier,
   (d) end blocks rigidly connected to the scale member carrier at both ends thereof, the end blocks defining recesses and having opposite sides,
   (e) means in the recesses of the end blocks for fastening the scale member carrier to an object at least at the end blocks and for compensating for length differences resulting from a differential thermal expansion of the scale member carrier and the object, the fastening and compensating means including
      (1) an intermediate part having two ends and defining a through hole between the ends for receiving a fastening element for fastening the end blocks to the object, and
      (2) webs having one end connected to the ends of the intermediate part and extending transversely to the longitudinal direction, the webs defining at least along a major portion of their length a clearance with the fastening element and adjacent surfaces of each recess, and an opposite end of the webs connected to the end blocks, the webs having a relatively small flexural stiffness in the longitudinal direction and a relatively high flexural stiffness in a direction extending transversely to the longitudinal direction.

2. The length measuring system of claim 1, wherein the mounting wall of the scale member carrier defines spaced apart recesses, and comprising further means in the recesses of the mounting wall for fastening the scale member carrier to an object and for compensating for length differences resulting from a differential thermal expansion of the scale member carrier and the object, the further fastening and compensating means including
   (1) an intermediate part having two ends and defining a through hole between the ends for receiving a fastening element for fastening the scale member carrier to the object, and
   (2) webs having one end connected to the ends of the intermediate part and extending transversely to the longitudinal direction, the webs defining at least along a major portion of their length a clearance with the fastening element and adjacent surfaces of each recess in the mounting wall, and an opposite end of the webs connected to the mounting wall, the webs having a relatively small flexural stiffness in the longitudinal direction and a relatively high flexural stiffness in a direction extending transversely to the longitudinal direction.

3. The length measuring system of claim 2, wherein each recess in the end blocks and the mounting wall is defined by a first recess formed in one of the opposite sides and a second recess formed in the other one of the opposite sides, the webs extending between the second recess and the first recesses.

4. The length measuring system of claim 3, wherein the first and second recesses are slots formed in the opposite sides, respectively, of the mounting wall and the end blocks, and extending transversely to the longitudinal direction whereby the webs are formed therebetween in the mounting wall and the end blocks.

5. The length measuring system of claim 1, wherein the scale member is of glass, the scale mounting wall of the glass scale member defines a groove in one of the opposite sides and opening into the internal cavity, the groove extending in the longitudinal direction and having opposite faces, the distance between the opposite groove faces exceeding the width of the scale member and an edge of the scale member extending into the groove between the opposite faces, the means connecting the scale member to the scale member carrier including a fastening body between the edge of the scale member and one of the groove faces, the fastening body being comprised of a rubber-elastic material adhering to the scale member and the one groove face and a reinforcing insert in the rubber-elastic material, the insert being of a material having approximately the same coefficient of expansion as the glass scale member.

6. The length measuring system of claim 5, wherein the fastening body is a laminated strip comprised of two strips of silicone rubber and a steel strip therebetween.

7. A length measuring system comprising
   (a) an elongate scale member adapted to be scanned for generating measured-length signals,
   (b) a tubular scale member carrier defining an internal cavity housing the scale member,
      (1) the scale member and the scale member carrier extending in a longitudinal direction,
   (c) means connecting the scale member to the scale member carrier, the connecting means permitting a longitudinal movement of the scale member relative to the scale member carrier,
   (d) end blocks rigidly connected to the scale member carrier at both ends thereof, the end blocks defining first and second recesses in opposite sides thereof,
   (e) means in the recesses of the end blocks for fastening the scale member carrier to an object at least at the end blocks and for compensating for length differences resulting from a differential thermal expansion of the scale member carrier and the object, the compensating means including
      (1) an intermediate part having two ends and defining a through hole between the ends for receiving a fastening element for fastening the end blocks to the object, and (2) webs having one end connected to the ends of the intermediate part in the first recess and extending transversely to the longitudinal direction, the webs defining at least along a major portion of their length a clearance with the fastening element and adjacent surfaces of the first recess, and an opposite end of the webs secured to the end blocks in the second recess, the webs having a relatively small flexural stiffness in the longitudinal direction and a relatively high flexural stiffness in a direction extending transversely to the longitudinal direction, the intermediate part and the webs forming an insert in the recesses which is hat-shaped in a longitudinal section thereof.

8. The length measuring system of claim 1, wherein each end block has a shoulder between the first and second recesses, the opposite ends of the webs have flanges extending in the longitudinal direction and countersunk in the second recess, the flanges being fastened to the shoulder, the webs engage the shoulder along a minor portion of their length between the major portion thereof and the flanges, and the through hole in the intermediate part is an elongated slot extending parallel to the webs.

9. The length measuring system of claim 1, wherein the intermediate part is thicker than the webs and is substantially resistant to flexure.

* * * * *